United States Patent [19]

Glodin et al.

[11] 4,223,963

[45] Sep. 23, 1980

[54] ANTIFRICTION BEARING, METHOD OF MAKING SAME AND ANTIFRICTION MATERIAL FOR PERFORMING THIS METHOD

[76] Inventors: Jury N. Glodin, pereulok Frunze, 4, kv. 12; Albert G. Eliseenko, Privokzalnaya ulitsa, 19, kv. 48, both of Pavlovsky Posac Moskovskoi oblasti; Petr A. Pshenichkin, Tsentralnaya ulitsa, 4, kv. 6; Evgeny A. Smirnov, ulitsa Mayakovskogo, 3, kv. 8, both of Elektrougli Moskovskoi oblasti; Nikolai N. Khavsky, ulitsa Gubkina, 4, kv. 73; Lev B. Kuznetsov, ulitsa Pljuschikha, 42, korpus 1, kv. 47, both of Moscow, all of U.S.S.R.

[21] Appl. No.: 928,693

[22] Filed: Jul. 27, 1978

[30] Foreign Application Priority Data

Aug. 1, 1977 [SU]  U.S.S.R. .............................. 2505001

[51] Int. Cl.² ............................................. F16C 19/00
[52] U.S. Cl. ................................ 308/188; 29/149.5 R; 308/187; 308/201
[58] Field of Search ........ 308/201, 188, 187, 217–218; 29/148.4, 149.5

[56] References Cited

U.S. PATENT DOCUMENTS

| 2,969,264 | 1/1961 | Lamson et al. ...................... 308/187 |
| 3,198,735 | 8/1965 | Lamson et al. ...................... 308/187 |
| 4,022,516 | 5/1977 | Smith et al. ...................... 308/187 X |

*Primary Examiner*—Douglas C. Butler
*Attorney, Agent, or Firm*—Steinberg and Blake

[57] ABSTRACT

The unoccupied space intermediate the races, the rolling bodies and the metal cage of a conventional antifriction bearing is filled with a solidified antifriction compound, with the cage of the conventional bearing being fast with the compound and reinforcing it. An annular gap is provided intermediate the outer race of the bearing and the solidified compound body for removal of the wear products. To manufacture a bearing of this kind, a bearing of the conventional kind is filled with a solidifiable antifriction material, with subsequent thermal treatment. The invention offers a simple, readily implementable and relatively inexpensive technique of adding a new quality to conventional antifriction bearings, viz. the ability of prolonged operation under adverse conditions, without periodic lubrication.

8 Claims, 1 Drawing Figure

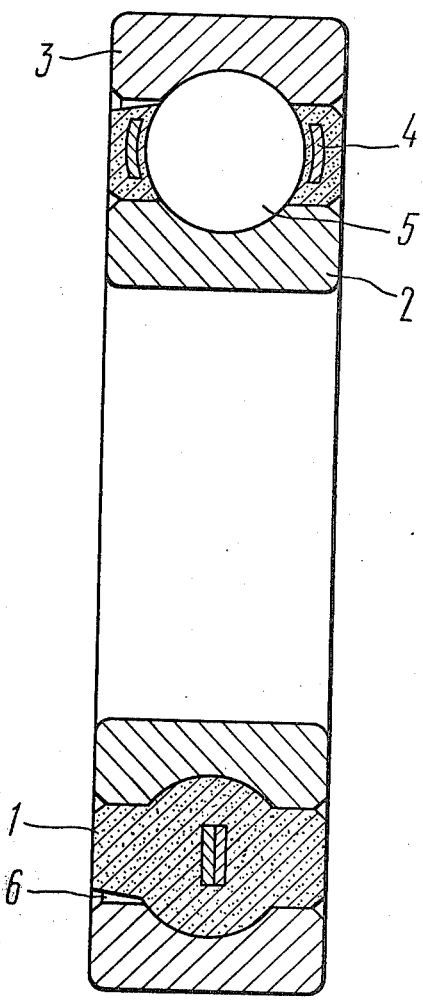

ANTIFRICTION BEARING, METHOD OF MAKING SAME AND ANTIFRICTION MATERIAL FOR PERFORMING THIS METHOD

The present invention relates to general engineering, and more particularly it relates to the manufacturing of antifriction bearings, such as ball bearings. More particularly, still, the invention relates to the structure of a bearing, to the method of its manufacture, and to an antifriction material for effecting this method.

There is known a ball bearing comprising an inner race, an outer race and a retainer or a cage with balls accommodated between the races. An antifriction coating is applied onto the friction-contact surfaces of the bearing in the course of its manufacture, the coating being in the thin-film form (see, for example, "Solid Lubricants and Antifriction Coatings" by e. r. Breightweight, "KHIMIA" Publishers, Moscow, 1967, p. 285).

A disadvantage of this bearing and of the method of its manufacture is the relatively rapid wearing out of the coating, which curtails the service life of the bearing.

There is further known an antifriction bearing comprising an inner race and an outer race, with rolling bodies received therebetween, a cage and protective washers, the space intermediate the races being filled with an antifriction material (see, for example, "Antifriction Bearings" Reference Book, Moscow, 1961).

The method of manufacturing a bearing of this kind includes making its components, assembling the bearing, filling-in the antifriction material and pressing-in the protective washers, e.g. by calking, beading, etc. (see, for example, the last-cited Reference Book).

For the antifriction material there is used a solid grease of the suitable types (see, for example, "Antifriction Bearings" by R. D. Beiselman and B. V. Tsypkin, "MASHGIZ" Publishers, Moscow-Lenigrad, 1961).

Bearings manufactured by this method with the use of solid lubricants or greases are more durable in operation under relatively moderate temperatures within the range between 100° C. and 200° C.; however, under more elevated temperatures, e.g. within a range from 200° C. to 400° C. their reliability is affected by the lubricant melting, flowing out and partly burning, while its replenishment is practically impossible.

There is still further known an antifriction bearing comprising an outer race, an inner race, rolling bodies and a cage, wherein the cage is made of a self-lubricating material, e.g. fluoroplastic loaded with molybdenum sulphide and other solid lubricants (see, for example, "Dry-Friction Bearings" by V. D. Voronkov, "MASHINOSTROJENIJE" Publishers, Leningrad, 1968). The method of manufacturing such a bearing includes making the inner and outer races, the cage and rolling bodies, and assembling the bearing.

However, bearings with self-lubricating cages are difficult to manufacture and would not offer sufficiently long service life, on account of the wearout of the cage. This can be explained by the double function performed by the cage in the bearing, namely, that of the cage per se and that of the lubricant, so that the cage is expected to meet controversial requirements. The load-carrying ability of this cage is understandingly inferior to that of conventional cages. Although the cage as such is not acted upon by great loads, it, nevertheless, is practically inadvertently acted upon in operation by various types of additional strain of the tensile and bending character, on account of the inaccuracy of the dimensions of the components of the bearings, even those falling within the manufacturing tolerances. More often than not the strain is so great that it causes the failure of the cage of the type being discussed (see, for example, "Friction and Wear in Vacuum" by I. V. Kragalski et al., "MASHINOSTROJENIJE" Publishers, Moscow, 1973).

There is known an antifriction bearing comprising an outer race, an inner race and a cage with rolling bodies accommodated therebetween, the space intermediate the outer and inner races being filled with a solid antifriction material.

The method of manufacturing a bearing of this kind includes making the outer race and the inner one, the separator and the rolling bodies, assembling the bearing and introducing thereinto the plastic solidifiable material, whereafter the races of the bearing are rotated relative to each other, with the simultaneous thermal treatment. In this way setting and hardening of the initially plastic material is effected, so that the space intermediate the inner and outer races becomes filled with the solid antifriction material protecting the friction-contact surfaces of the bearing from wear and pollution.

The material is a compound including a binder, e.g. soluble glass or alumochromophosphate, graphite and molybdenum disulphide, taken in a 5:1:4 proportion by weight.

This bearing, the method of its manufacture and the antifriction material for effecting this method constitute the closest prior art of the present invention.

The last-described general structure of the bearing manufactured by the aforementioned method with the use of the solid antifriction material enables in many cases to improve the durability of the bearing, as compared with other abovedescribed structures. However, the series of stand-testing which has been conducted has shown that under relatively arduous operating conditions, e.g. in operation at 360° C. and a 200-kg load, the service life of the bearing becomes significantly curtailed. This can be explained, among other things, by the fact that in the hitherto known method, during the rotation of the races of the bearing relative to each other the antifriction material has not yet solidified, whereby there is formed about the rolling bodies a dense caked layer of the wear products of this material, so that in actual operation the rolling bodies engage not the solid antifriction material per se, which is expected to lubricate the rolling bodies, but the products of the wearout of this material. Therefore, the friction zone of the bearing becomes polluted with these products of the wearout and decomposition of the antifriction material. However, the structure of this bearing of the prior art would not provide facilities for removing these products from the friction zone. Moreover, the abovementioned employed antifriction material itself is inadequately strong, so that the amount of the products of its wearout and decomposition is relatively great.

The above reasons combine to curtail significantly the operational life of the bearing.

There is further known an antifriction bearing wherein, in order to reduce the slip of the balls along the groove of the race, and, consequently, to reduce friction losses, the cage made of either textolite or of polyamides with various fillers is reinforced by a metal ring (see, for example, "Designing Plastic Components" by I. Y. Alschits et al., "MASHINOSTROJENIJE" Publishers, 1969, p. 174).

This combination of a non-metallic cage and metal reinforcement enables to increase to a certain degree the strength of the cage, but, however, fails to ensure reliable operation of the bearing under arduous operating conditions, on account of the rolling bodies engaging exclusively the solidified antifriction material, whereby local destruction of the antifriction material is not prevented, followed by its eventual complete breakdown, while the reinforcing ring is not altogether a guarantee against the breakdown of the cage.

In accordance with the abovesaid, it is one of the objects of the present invention to provide an antifriction bearing which should offer sufficient durability under such trying operating conditions as vacuum, low temperatures, as low as −70° C., and elevated temperatures, as high as +350° C.

It is another object of the present invention to provide an antifriction bearing wherein the rolling bodies and the rolling tracks of the races should be protected against an adverse action of the environment, e.g. moisture- or dust-laden ambient air.

It is also an object of the present invention to provide an antifriction bearing wherein the lubrication of the rolling bodies should be effected by a solidified compound filling the space intermediate the races, the rolling bodies and the steel cage.

It is a further object of the present invention to create a bearing wherein the solidified compound should be maintained in intimate friction engagement with the rolling tracks of the races.

It is yet another object of the present invention to develop a method of manufacturing bearings of the abovespecified improved type and an antifriction material, which should enable to have to do with conventional antifriction bearings having metal retainer of the rolling bodies, i.e. the cage.

These and other objects are attained in an antifriction bearing comprising an inner race and an outer race separated by rolling bodies loosely received in the cells of an annular metal cage of a conventional kind. In accordance with the invention, the bearing is characterized in that the space intermediate the races, the rolling bodies and said conventional metal cage is filled with a solidified antifriction compound fast with said conventional metal cage, with the cage reinforcing said compound.

The above novel features enable to step up considerably the service durability of a conventional bearing and to prolong its life, owing to the solidified compound protecting the surfaces of the rolling tracks, of the cage and of the rolling bodies from pollution.

In accordance with one embodiment of the present invention, there is proposed an antifriction bearing characterized in that said compound fills the unoccupied space intermediate the components of a conventional bearing, there being left between the compound body and the internal surface of the outer ring an annular gap reaching up to the rolling bodies and sufficient for unobstructed disposal of the products of the wearing out of the compound.

This feature means that the annular gap left between the compound body and the internal surface of the outer ring, reaching up to the rolling bodies, enables to save the surfaces of the rolling tracks of the races and the rolling bodies from the action thereupon of the wearout products of the compound.

In accordance with another embodiment of the present invention, there is proposed an antifriction bearing characterized in that the portions of said compound in the zone intermediate the rolling bodies in the enclosed part of the bearing are maintained in an intimate friction-type engagement with the rolling tracks of the races, while the face end portions of the compound body are spaced from the internal cylindrical surface of the race by a positive gap.

This feature enables to carry out continuous lubrication of the rolling tracks of the bearing, while conducting continuous removal of the wearout products of the compound via the positive gap between the end face portion of the compound body and the internal cylindrical surfaces of the races.

In accordance with yet another embodiment of the present invention, there is proposed a method of manufacturing a bearing, including filling the spaces intermediate the rolling bodies with a plastic solidifiable antifriction compound, characterized in that said filling with the compound is effected with a conventional antifriction bearing having an annular metal retainer of the rolling bodies, i.e. the cage, and that thermal treatment is conducted to provide for fast engagement between the solidified compound body and the conventional metal cage acting as the reinforcement of this compound body.

This feature enables to use a simple, easily implemented and relatively inexpensive technique to add a new quality to a conventional antifriction bearing, namely, the ability of working for prolonged period under arduous operating conditions without periodic lubrication.

In accordance with yet another embodiment of the present invention, there is proposed a method characterized in that the thermal treatment of the bearing is conducted in two stages, the first stage immediately following the filling of the bearing with the plastic solidifiable antifriction material and being conducted for 2 to 4 hours at a temperature from 200° C. to 250° C., until the material looses its fluidity while retaining the viscosity, and the second stage being conducted after the forming of the groove at a temperature from 260° C. to 300° C. for complete solidifying of the material.

This feature enables to provide the annular gap between the compound body and the internal surface of the outer ring without polluting the surfaces of the rolling tracks and of the rolling bodies with the wearout products of the compound.

In accordance with a still another embodiment of the present invention, there is proposed a method characterized in that the plastic solidifiable antifriction material is introduced into the bearing by injecting it intermediate the races of the bearing for the material to fill completely the available unoccupied space.

This feature enables to attain the maximum strength of the solidified compound body.

In accordance with another embodiment of the present invention, there is proposed an antifriction material for effecting the method, including graphite and a binder preferably selected from a group including soluble glass and alumochromophosphate, characterized in that it additionally includes copper, lead, tin, coal coke and carbon black in the following proportion, percent by weight:

copper—5 to 20;
lead—1.0 to 5.0;
tin—0.5 to 5.0;
coal coke—0.5 to 5.0;
carbon black—0.5 to 3.0;

graphite—13.0 to 37.0;
binder—the balance.

This feature does not preclude the use of an antifriction material of another composition for effecting the method and manufacturing a bearing in accordance with the present invention; however, the indicated material has an optimized composition with high antifriction properties, proven by practical testing.

Thus, the plastic solidifiable antifriction material which is preferably used for the manufacture of the herein disclosed bearing by the herein disclosed method includes graphite and a binder and is characterized from the hitherto known material used for a similar purpose in that it additionally contains copper, lead, tin, coal coke and carbon black taken in the following proportion, percent by weight:

copper—5.0 to 20.0;
lead—1.0 to 5.0;
tin—0.5 to 5.0;
coal coke—0.5 to 5.0;
carbon black—0.5 to 3.0;
graphite—13.0 to 37.0;
binder—the rest.

The binder, same as in the hitherto known material, may be in the form of soluble glass, or alumochromophosphate or else some other suitable known per se binder, e.g. organic binder.

Graphite can be used in the usual form, or in the form of thermographite.

It is essential, however, that the particle size in the mixture should not be in excess of 50 to 70 microns.

The antifriction capability of the herein disclosed material is substantially higher than that of other hitherto known materials used in similar applications.

The abovesaid will be illustrated hereinbelow by a detailed description, with reference being made to the accompanying drawing, of embodiments of the present invention, including the herein disclosed method effected with the use of the proposed antifriction material.

The appended drawing shows the sectional view of a bearing constructed in accordance with the invention.

The finished bearing includes a body of the solid antifriction material or compound 1 accommodated intermediate the inner race 2 of the bearing and its outer race 3. The body 1 of the antifriction material is fast with the cage or retainer 4 of the bearing, with the minimum spherical clearance separating it from the rolling bodies 5 of the bearing. Provided between the inner surface of the outer race 3 and the body 1 of the antifriction material is a groove 6 reaching depth-wise up to the rolling bodies 5. The body 1 of the solid antifriction material fills the friction-contact area or zone of the bearing, flush with the end face planes of the latter, thus enclosing the internal space of the bearing against pollution from the outside.

In operation of the bearing, the particles of the antifriction material are entrained into the sliding and rolling contact area toward the rolling bodies 5, lubricating the latter, while the products of the wearout of the antifriction material are removed by centrifugal forces via the groove 6 away from the bearing.

EXAMPLE 1

A mixture is prepared containing, percent by weight, copper—20, lead—5, tin—5, coal coke—0.5, carbon black—3, graphite—13, the rest up to 100% being soluble glass with modulus 3. The components are mixed in a stirring-vane mixer at ambient temperature. The thus prepared antifriction material or compound is injected or pressed into the pre-degreased bearing, for the material to fill up the entire unoccupied space intermediate the components of the bearing. Then the bearing with the compound therein is subjected to thermal treatment at 200° C. for 4 hours, and the 1-mm thick peripheral layer of the antifriction material body is removed to provide a groove between the outer race and the antifriction material, reaching depth-wise up to the rolling bodies. The groove is made using a suitable cutting tool in any machine or device suitable for the purpose. Then one race of the bearing is manually turned for a couple of revolutions relative to the other one, and the bearing is once again subjected to thermal treatment at 260° C. until the material solidifies and hardens completely. This done, the bearing is rotated operation-like at 1000 r.p.m. for one minute. The operations involved in the manufacturing of the components of the bearing and in assembling the latter being the same as those in the manufacturing of widely used conventional bearings, these operations are omitted in the present disclosure for brevity sake.

EXAMPLE 2

The method of preparing the antifriction material is similar to that described hereinabove in connection with Example 1, the components being taken in the following amounts, percent by weight: copper—5.0, lead—1.0, tin—0.5, coal coke—5.0, carbon black—0.5, thermographite—37.0, and binder—the balance. The binder is an alumochromophosphate one containing, percent by weight: $P_2O_5$—36.0, $Al_2O_3$—9.1, $Cr_2O_3$—4.5, water—the balance.

The thus prepared material is injected or pressed into the pre-degreased conventional bearing of the standard make, for the material to fill the entire unoccupied space intermediate the components of the bearing. The thermal treatment is conducted at 260° C. for two hours. Then in a lathe the groove 1.5 mm wide is cut between the outer race of the bearing and the body of the solid antifriction material, reaching depth-wise up to the rolling bodies, at both sides of the bearing. Then one race of the bearing is manually rotated relative to the other one, and the bearing is subjected once again to thermal treatment at 300° C. until the material completely solidifies and hardens. Then the bearing is rotated operation-like at 1450 r.p.m. for one minute.

EXAMPLE 3

The operations, their succession and the duty are those of Example 2, with the antifriction material being composed, as follows, percent by weight: copper—10.0, lead—2.5, tin—2.5, coal coke—2.5, carbon black—1.5, graphite—34.0, binder (same as in Example 2)—the balance.

Antifriction bearings manufactured in accordance with the present invention by the herein disclosed method with the use of the proposed antifriction material have been subjected to testing in comparison with bearings of the hitherto known type, the outcome of the testing being illustrated in Table below.

Table

| No. | Tested Item | Test Conditions | Service Life, hours |
|---|---|---|---|
| 1 | 2 | 3 | 4 |
| 1 | Bearing with solid antifriction filler and groove in | n = 1450 r.p.m. t = 350° C. | 2000, and still run- |

Table-continued

| No. 1 | Tested Item 2 | Test Conditions 3 | Service Life, hours 4 |
|---|---|---|---|
| | the filling material at the outer race diameter | P = 50 kgf | ning |
| 2 | Same as in 1, without the groove | n = 1450 r.p.m. t = 350° C. P = 50 kgf | 700, and broke down |
| 3 | bearing with solid antifriction coating | t = 350° C. P = 50 kgf | 18, and broke down |
| 4 | Bearing with solid antifriction filling and groove | n = 1000 r.p.m. P = 200 kgf | 40, and still running |
| 5 | Bearing with solid antifriction coating | n = 1000 r.p.m. P = 200 kgf | 1 (one), and broke down |
| 6 | Bearing of 4. | t = 120° C. steam-air mixture; loading trolley | 10,000, and still running |
| 7 | Bearing of 5. | t = 120°C. steam-air mixture; loading trolley | 720, and broke down |

To conclude, there have been developed a new multicomponent composition of an antifriction material, a structure of a bearing based on the conventional ones, filled with this material, and a method of manufacturing such bearings with the use of appropriate techniques and operation duties.

The outcome of the testing on testing stands and under real-life operation conditions have shown that the novel antifriction bearings offer reliability and durability dozens of times greater than those of the afore-mentioned hitherto known bearings.

What we claim is:

1. An antifriction bearing, comprising
   an inner race;
   an outer race spaced from said inner race;
   a metal annular cage located between said races and having a plurality of sockets;
   a plurality of rolling bodies loosely received in said sockets of said cage and separating said races, said rolling bodies, said cage and said races together forming an unoccupied space therebetween; and
   a body of antifriction solidified compound filling said unoccupied space and being fast only with said metal cage so that the latter is embedded in and acts as reinforcement of said body of antifriction solidified compound.

2. An antifriction bearing according to claim 1 wherein said compound fills said unoccupied space substantially completely, an annular gap being left between said compound body and the internal surface of said outer race, reaching up to said rolling bodies and of a sufficient size for unobstructed removal of the products of wearout of said compound body therethrough.

3. An antifriction bearing according to claim 2, wherein said compound body have portions in the zone intermediate said rolling bodies which are maintained in intimate friction contact with the rolling tracks of said races, the end face portions of said compound body being spaced from the internal cylindrical surface of said outer race by a positive gap.

4. A method of manufacturing an antifriction bearing, comprising the steps of
   providing an inner race, an outer race spaced from said inner race, a metal cage between the races and having a plurality of sockets, and a plurality of rolling bodies in the sockets and separating the races, so that an unoccupied space is formed between the rolling bodies, the cage and the races;
   and filling the thus formed unoccupied space by plastic antifriction solidifiable compound, in such manner that in said unoccupied space a body of the antifriction compound is formed which is fast only with the metal cage so that the latter is embedded in and acts as reinforcement of the body of the antifriction compound.

5. A method of manufacturing a bearing according to claim 4, including thermal treatment to provide for fast attachment of the solidifying compound to the conventional cage acting as the reinforcement of said antifriction compound body.

6. A method according to claim 5, wherein the thermal treatment of the bearing is conducted in two stages; with the first stage immediately following the filling of the bearing with the plastic solidifiable antifriction material and being conducted for about 2 to 4 hours at a temperature substantially within a range from 200° C. to 250° C. for the material to loose its fluidity while retaining its viscosity; the second stage being conducted after the forming of the groove, at a temperature substantially within a range from 260° C. to 300° C., for complete solidifying of the material.

7. A method according to claim 5, wherein the plastic solidifiable antifriction material is introduced into the bearing by being positively injected intermediate the races of said bearing, to fill completely the unoccupied space.

8. An antifriction material for effecting the method according to claim 5, including graphite and a binder selected from a group including soluble glass and alumochromophosphate, and also copper, lead, tin, coal coke and carbon black, taken in the following proportion, percent by weight:
   copper—5.0 to 20.0;
   lead—1.0 to 5.0;
   tin—0.5 to 5.0;
   coal coke—0.5 to 5.0;
   carbon black—0.5 to 3.0;
   graphite—13.0 to 37.0;
   binder—the balance.

* * * * *